(12) United States Patent  
Cato et al.

(10) Patent No.: US 7,681,796 B2  
(45) Date of Patent: Mar. 23, 2010

(54) MOBILE DEVICE TRACKING

(75) Inventors: Robert Thomas Cato, Raleigh, NC (US); Thomas Guthrie Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1088 days.

(21) Appl. No.: 11/325,952

(22) Filed: Jan. 5, 2006

(65) Prior Publication Data

US 2007/0152057 A1   Jul. 5, 2007

(51) Int. Cl.
*G06K 5/04* (2006.01)
*G06K 19/06* (2006.01)

(52) U.S. Cl. .............................. 235/462.08; 235/462.16
(58) Field of Classification Search ............ 250/559.22; 348/501; 382/291; 235/462.16, 462.08
See application file for complete search history.

(56) References Cited

U.S. PATENT DOCUMENTS

| | | | |
|---|---|---|---|
| 4,727,492 A | 2/1988 | Reeve et al. ................. 364/424 |
| 4,750,123 A | 6/1988 | Christian | |
| 4,790,402 A | 12/1988 | Field et al. .................. 180/169 |
| 4,918,607 A | 4/1990 | Wible .................... 364/424.02 |
| 5,051,906 A | 9/1991 | Evans, Jr. et al. ....... 364/424.02 |
| 5,076,690 A | 12/1991 | deVos et al. .................. 356/152 |
| 5,202,742 A | 4/1993 | Frank et al. ..................... 356/5 |
| 5,742,263 A * | 4/1998 | Wang et al. ..................... 345/8 |
| 5,753,931 A * | 5/1998 | Borchers et al. ........ 250/559.22 |
| 5,767,914 A * | 6/1998 | Jennes et al. ................. 348/501 |
| 5,812,267 A | 9/1998 | Everett, Jr. et al. .......... 356/375 |
| 6,446,865 B1 | 9/2002 | Holt et al. .................... 235/382 |
| 6,556,722 B1 * | 4/2003 | Russell et al. ................ 382/291 |
| 6,717,154 B2 * | 4/2004 | Black et al. .................. 250/393 |
| 7,137,558 B2 * | 11/2006 | Aigeldinger ........... 235/462.16 |
| 2002/0010694 A1 | 1/2002 | Navab et al. | |
| 2002/0139857 A1 * | 10/2002 | Ishii et al. .............. 235/462.25 |
| 2007/0164115 A1 * | 7/2007 | Joseph et al. .......... 235/462.21 |

FOREIGN PATENT DOCUMENTS

| | | |
|---|---|---|
| CN | 1691883 A | 11/2005 |
| DE | 4429016 A1 | 2/1996 |
| EP | 0252219 A2 | 1/1988 |
| FR | 2535068 A1 | 4/1984 |
| GB | 2284907 A | 6/1995 |

OTHER PUBLICATIONS

Notification of Transmittal of the International Search Report and the Written Opinion of the International Searching Authority, or the Declaration dated Sep. 3, 2007 and corresponding to PCT application No. PCT/EP2006/070087.

* cited by examiner

*Primary Examiner*—Kumiko C Koyama
*Assistant Examiner*—Sonji Johnson
(74) *Attorney, Agent, or Firm*—Jason O. Piché

(57) ABSTRACT

The present invention provides a method, apparatus, and computer program product for obtaining the location of, for example, a mobile device. An image of a target in a defined space is obtained, the target encoding data from which its location in the defined space may be determined. The position of a reference point in the image which represents the location of, for example, a mobile device, is determined relative to the target. The location of the mobile device in the defined paces is then determined by combining the location of the target in the defined space with an appropriately scaled version of the relative position of the reference point to the target in the image.

2 Claims, 11 Drawing Sheets

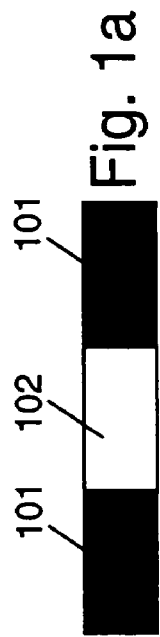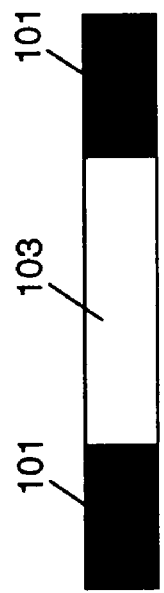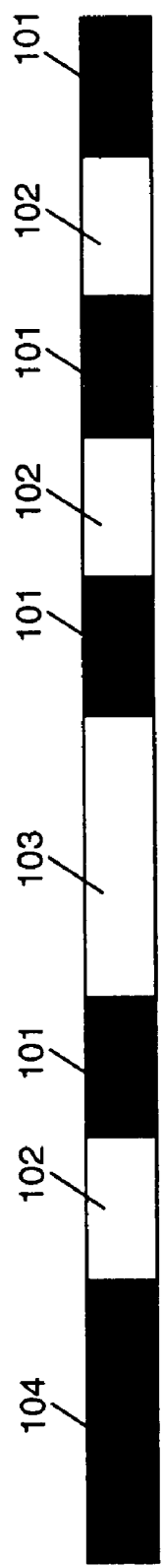

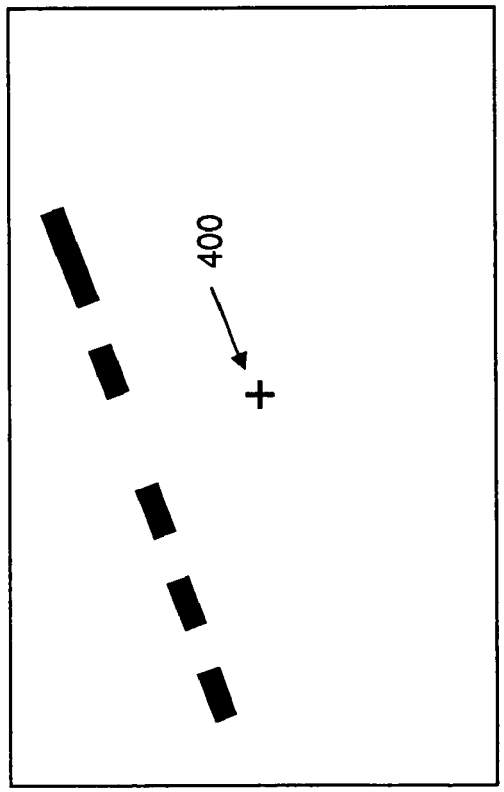
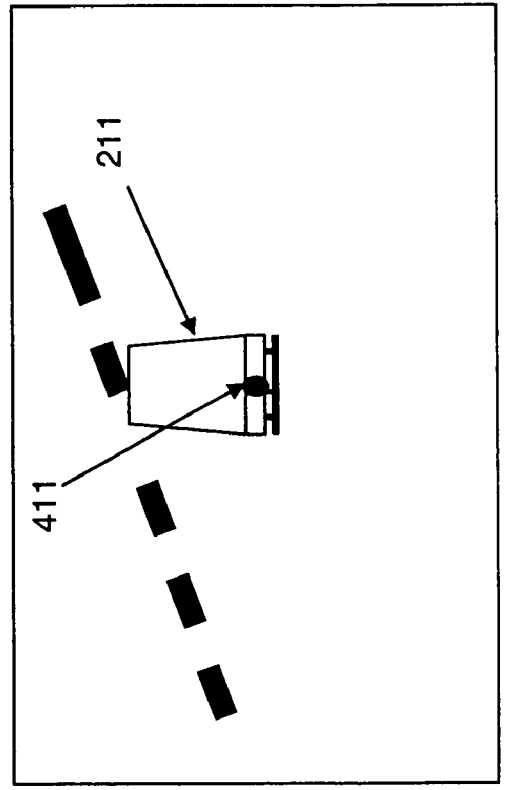

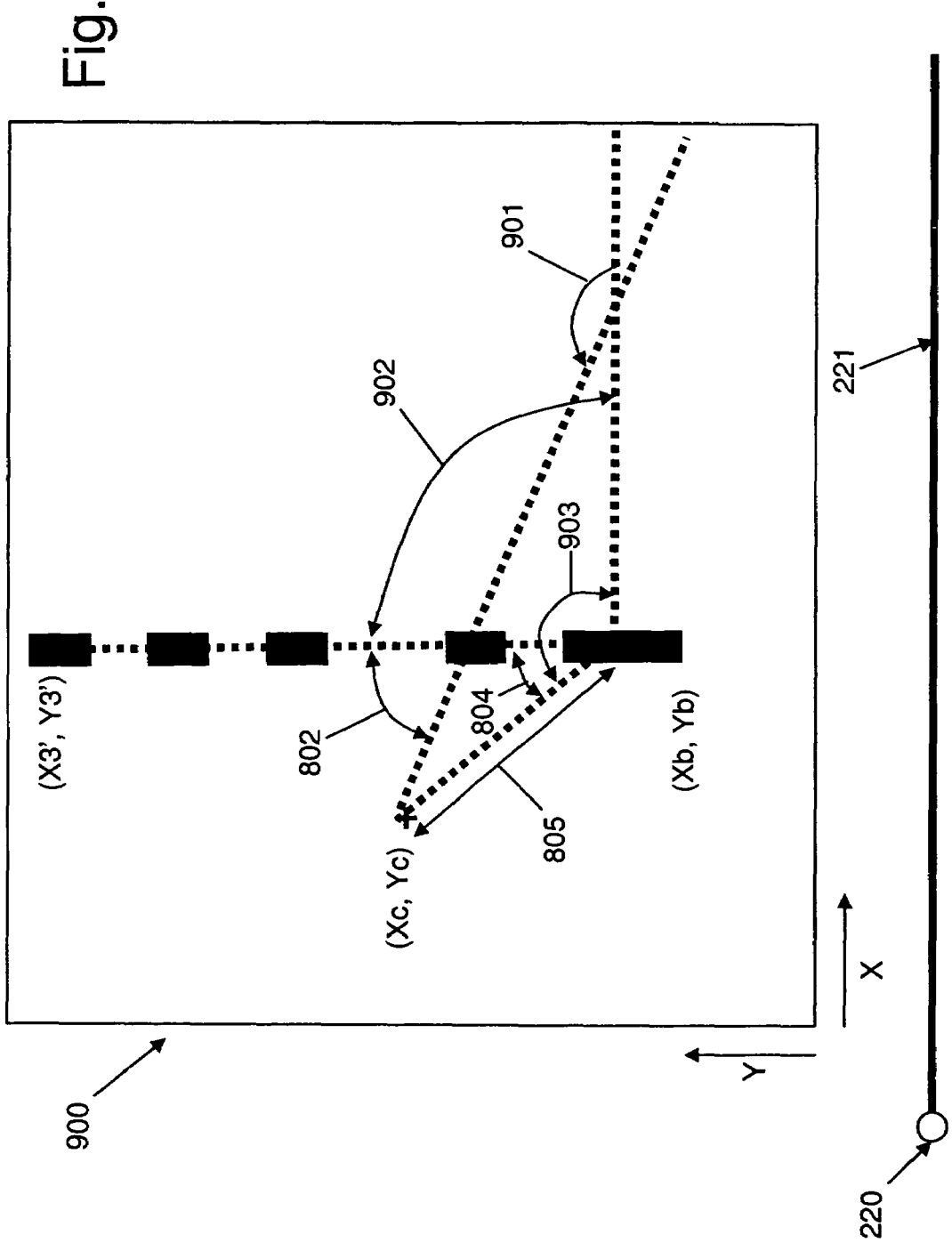

MOBILE DEVICE TRACKING

BACKGROUND TO THE INVENTION

1. Field of the Invention

The present invention relates to mobile device tracking and more particularly to determining the location of a mobile device using targets which encode information.

2. Background to the Invention

A common scenario in which location of a mobile device is obtained for the purposes of tracking is in a modem store where the mobile device which is tracked is a shopping cart. A cart may be tracked for a variety of reasons, for example, to obtain knowledge of the flow of customers through a store to use when arranging products in the store to avoid bottlenecks and ensure maximum exposure of specific products selected for promotion. For example, knowledge of the current location of a cart is used to provide information to the customer using the cart, which is pertinent to that location in the store, such information being provided to a display device associated with a shopping cart.

One known method of tracking the location of a shopping cart in a store uses powered infra-red beacons which are attached at regular intervals to the ceiling of a store. Each beacon transmits a burst of infra-red which encodes a unique zone identification. The infra red signal is then received by an infra-red receiver mounted on a shopping cart thus enabling zone in which the shopping cart is located to be determined. However, there are several problems with this method. For example, the beacons require power and as a result it is necessary to either replace batteries in each beacon at regular time intervals or install an expensive wiring harness connected to an electricity supply. Further store lighting and/or lighting ballasts can cause interference with the infra-red receiver on the cart, and also the granularity of the location depends on the distance between the beacons.

An alternative known method of tracking the location of a shopping cart in a store uses one or more wireless LAN (WLAN) access points and the location of a cart is calculated using the signal strength for the various access points measured by a receiver located on the shopping cart. However this method also has known problems which include metal in the store environment causing reflections and multi-path, reducing accuracy of position measurement such that additional access points and directional antenna may have to be added to the store to provide sufficient spatial resolution and robustness. Further the received signal, and calculated cart position, may be affected by antenna orientation (rotation) and also the access points require a power connection.

Position related activities and tracking in respect of mobile devices is also preformed in other fields in which it is known to use, for example, electronic tags, RFID tags, or barcodes for this purpose.

For example, U.S. Pat. No. 5,076,690 to deVos, et al., discloses position sensing based on the triangulation calculation using at least three retro-reflective elements spaced apart and positioned at known locations. One of the retro-reflective elements may be a bar code so that it is identifiable. A rotating member with a light transmitting and detecting device is used to locate and illuminate the retro-reflective elements. However this solution is not suitable, for example, for determining cart location in a store because it requires a line of sight to at least 3 wall mounted reflectors which would be difficult to achieve for all possible cart locations in a large store.

For example U.S. Pat. No. 5,812,267 to Everett, et al., discloses determining a distance from multiple reflectors using two sensors each of which each generate light and detect a reflected light signal from a reflector. Triangulation is then used to determine a distance from the reflectors based on the detected signals from each sensor. However, this solution is not suitable, for example, for determining cart location in a store because it calculates only a distance from the reflectors and cannot distinguish one reflector from another. As a result it is only possible to calculate location based on a known previous location which is not appropriate for a shopping cart.

For example U.S. Pat. No. 4,918,607 to Wible, et al., discloses position sensing based on the triangulation calculation using reflection from two retro-reflective elements each of which encode their location using a bar code. A scanning process is used to locate the retro-reflective elements which are positioned in pre-selected spaced apart co-linear locations. However, this solution is also not suitable, for example, for determining cart location in a store because the scanning mechanism scans only selected areas and restricts the locations into which the retro-reflective elements must be placed.

Further in the art it is known to use retro-reflective barcodes in guidance systems. For example U.S. Pat. No. 5,202,742 to Frank, et al., discloses a laser radar apparatus for vehicle guidance along a road. Light propagation delay from a reflective target is measured to determine target distance and a scanning mirror used to measure the angle between the laser apparatus and the reflective target. The trigonometric relationship of the target distance and angle are then used to calculate distance from the target. The reflective targets may incorporate a bar code which imparts information such as the side of the road, an approaching exit, speed limit changes etc. Further, for example U.S. Pat. No. 4,790,402 to Field, et al., discloses a guidance system in which a lateral scanning laser transmitter-receiver detects retro-reflective targets along a path and these are used to keep the vehicle on a prescribed path. The retro-reflective targets may include perpendicular bar-codes to make them easier to identify and read by the scanner.

However, guidance systems do not provide a solution suitable, for example, for determining cart location in a store in which a shopping car can be moved unpredictably around a store. This is because, for example, the guidance systems calculate a position of a vehicle relative to a target, and this information is then used to locate the next target and maintain the vehicle on a prescribed path. Accordingly if the vehicle loses sight of a next target it becomes lost and cannot re-determine its position based on a subsequent detection of another target. However because a customer with a shopping cart does not generally follow a prescribed path it is necessary to determine a location based on detection of a single target.

Accordingly none of the known art in related fields provides a solution to the problems associated with the current solutions to determining position of shopping cart.

SUMMARY OF THE INVENTION

It is an object of the present invention to provide a system suitable for use in determining the location of a shopping cart in a store in which the target used to determine cart location is passive, that is, it requires no external power. It is a further object of the invention to determine the location of a shopping cart in a store from detection of a single target and further in which location of each target is relatively flexible.

Accordingly, according to a first aspect the present invention provides a method comprising; obtaining an image of a target in a defined space, the target encoding identification data; analyzing the image to obtain the identification data and image positional data, the image positional data comprising a position in the image of a reference point relative to the target;

using the identification data to obtain target location data comprising a location of the target in the defined space; and determining the location of the reference point in the defined space by combining the image positional data and the target location data.

According to a second aspect the present invention provides a computer program product comprising a computer useable medium having a computer readable program, wherein the computer readable program when executed on a computer causes the computer to perform a method comprising: obtaining an image of a target in a defined space, the target encoding identification data; analyzing the image to obtain the identification data and image positional data, the image positional data comprising a position in the image of a reference point relative to the target; using the identification data to obtain target location data comprising a location of the target in the defined space; and determining the location of the reference point in the defined space by combining the image positional data and the target location data.

Because an image of the target device is used to determine the location of the reference point the target can be passive, for example a barcode of at least two different colors. For example the defined space could be the inside of a store.

Preferably the reference point represents the location from which the image was taken. As a result the method can be used, for example, to determine the location of a device, such as a shopping cart, from which the image was obtained.

If the reference point represents the location from which the image was taken optionally the location data further comprises defined space orientation data for the target in the defined space and the image is further analyzed to obtain image orientation data comprising a direction from which the image was taken relative to the target. This enables the direction from which the image was taken in the defined space to be determined by combining the image orientation data and the defined space orientation data.

Alternatively to the reference point representing the location from which the image was taken, the reference point could represent a second target which is at least partially included in image. As a result the target location data is used to determine the location in the defined space of the second target.

For example, the target could be reflective in which case a light source may be used to illuminate the target when obtaining the image.

If a light source is used to illuminate the target optionally a first image and second images are obtained from a given location. The first image is obtained in the absence of the light source illuminating the target such that that target does not appear in the image, and the second image is obtained with the light source illuminating the target such that the target does appear in the image. The image of the target is then obtained by subtracting the first image from the second image. This reduces any background data in the image which is not part of the target making it easier to analyze.

Optionally the identification data is used to access a database entry which comprises the target location data. Alternatively the identification data encodes target location data, Preferably the target is a barcode target is a barcode which is decodes to obtain the identification data.

According to third aspect the present invention provides an apparatus comprising: an image capture device for obtaining an image of a target which encodes identification data; and at least one processor for: analyzing the image to obtain the identification data and image positional data, the image positional data comprising a position in the image of a reference point relative to the target; using the identification data to obtain target location data comprising a location of the target in the defined space; and determining the location of the reference point in the defined space by combining the image positional data and the target location data.

Note that for example the at least one processor may comprise microprocessor for analyzing the image and a data processor for using the identification data determining the location of the reference point. Optionally the data processor is remote from the microprocessor and the apparatus further comprises a communication device for sending the identification data and image displacement data from the micro processor to the data processor for using the identification data.

Optionally the apparatus further comprises an illumination device for illuminating the target. For example, if the target is reflective the image can be taken whilst the target is reflecting light from the communication device.

If the apparatus comprises an illumination device optionally the illumination device is capable a outputting a plurality of levels of illumination and the at least one processor is further varies the level illumination output from the illuminating device.

Optionally the at least one processor further controls the image capture device and direct it when to take an image.

The image capture device could be, for example, a digital camera or a video camera. If image capture device is a video camera and optionally the apparatus further comprises a comparator and a video sync separator. The comparator receives the image from the image capture device and outputs a binary signal, based on a predetermined brightness level of the pixel, for converting the image from the image capture device to a binary image. For example the comparator may output a 1 for a pixel darker that the predetermined brightness level and 0 for pixel lighter than the predetermined brightness level. The video sync separator indicates binary signals from the comparator which indicate the start of a new image frame and binary signals from the comparator which indicate the start of a new image line.

If a comparator is used optionally at least one processor varies the predetermined brightness level to improve characteristics of the image which, for example, make it easier to obtain the identification data of the target.

Optionally the further comprises a shopping cart onto which the image capture device and a processor for analyzing the image are mounted.

According to a fourth aspect the present invention provides a defined space comprising: a plurality of spaced apart targets distributed around the defined space, each barcode encoding identification data which can be use to determine the location in the defined space of the target; and an apparatus according to the third aspect.

Preferably the defined space further comprises a surface covering the defined space and on to which the targets are mounted using Velcro.

For example the surface could be a ceiling. For example the defined space could be a store.

BRIEF DESCRIPTION OF THE DRAWINGS

Some of the purposes of the invention having been stated, others will appear as the description proceeds, when taken in connection with the accompanying drawings, in which:

FIGS. 1*a*-1*d* illustrates barcode retro-reflective targets according to the preferred embodiment of the present invention;

FIGS. 4a and 4b are illustrations of an example image (as viewed from the floor looking up at the ceiling) taken of a barcode retro-reflective target, by the system of FIG. 3, according to the preferred embodiment of the present invention;

FIG. 9 is the image of FIG. 8 rotated and with additional markings used to describe the calculations used to analyze an image of a barcode. All distances and coordinates in FIG. 9 are in physical units.

DETAILED DESCRIPTION OF THE ILLUSTRATED EMBODIMENTS

Figure 2:
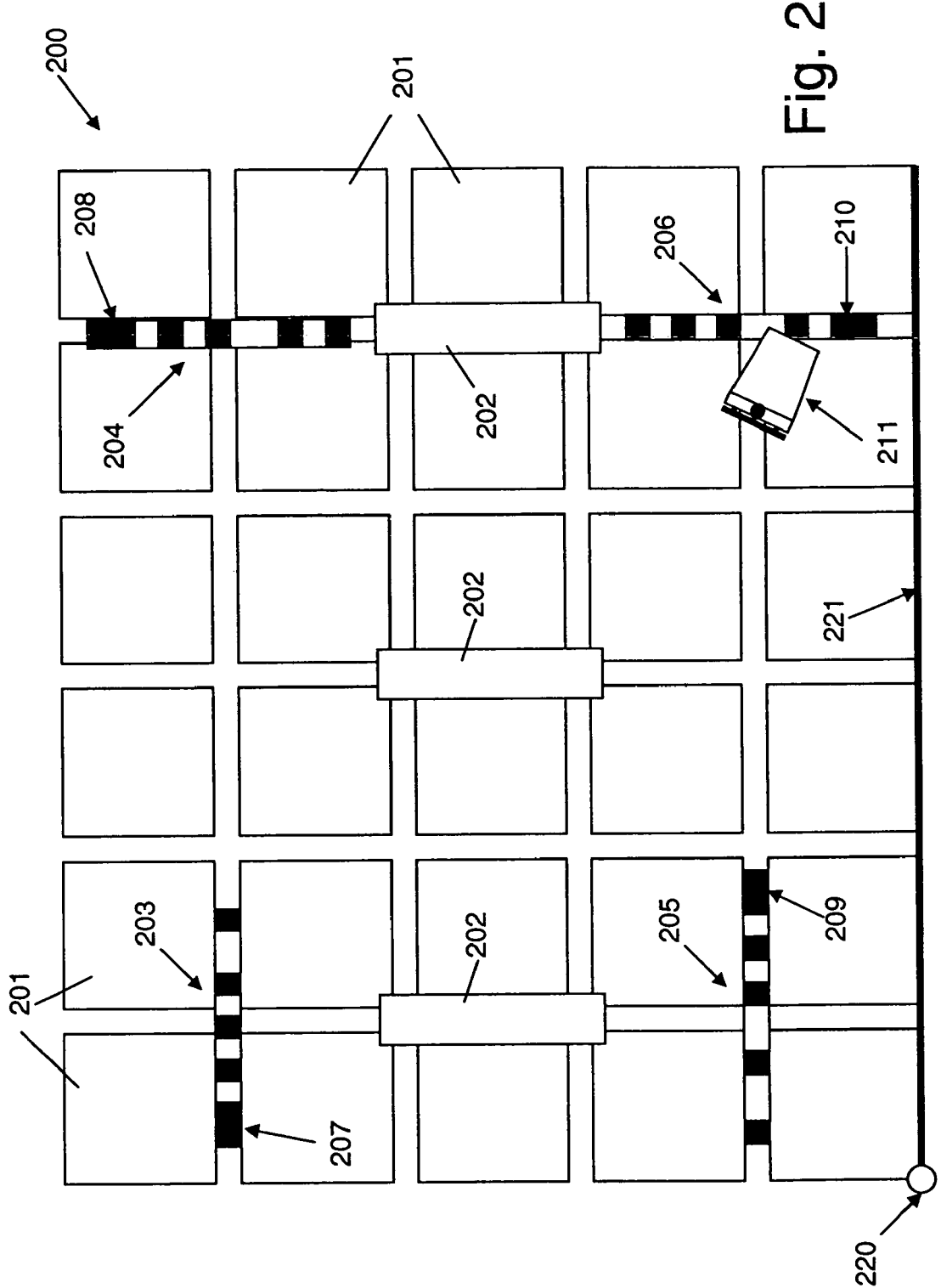
FIG. 2 illustrates an example of a store ceiling (as viewed from the floor looking up at the ceiling) according to the preferred embodiment of the present invention.

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

In the preferred embodiment of the present invention, the location of a shopping cart in a store is determined using retro-reflective barcode targets which are affixed to the ceiling of the store. An image of a barcode target is obtained using a camera mounted on the shopping cart such that a position in the image represents the cart location. The image is then analyzed to read the barcode and determine image positional data and image orientation data. The image positional data comprises "Cart/Barcode Image Polar Coordinates" which are the polar coordinates (in the image) of the cart relative to the barcode. The "Cart/Barcode Image Polar Coordinates" comprise the "Cart/Barcode Image Angle" which is the angle from the cart to the barcode target in the image, and the "Cart/Barcode Image Radius" which is the distance in the image (in image units) from the cart to the barcode target. The image orientation data comprises "Cart/Barcode Image Orientation" which is the direction in which the cart is pointing relative to the barcode. A decode of the barcode target is then used to access a database and obtain "Barcode/Store Orientation" and "Barcode/Store Location", which are the physical orientation and location data for the barcode target in the store. The physical orientation and location data are then combined with the image positional data to determine "Cart/Store Location" and "Cart/Store Orientation" (the physical position and orientation of the cart in the store relative to a reference point and a reference line defined for the store). This will now be described in detail with reference to FIGS. 1 to 9.

FIGS. 1a and 1b show the basic building blocks of a barcode retro-reflective target (barcode) according to the preferred embodiment of the present invention. FIG. 1a shows two retro-reflective sections 101 separated by a non retro-reflective section 102 which is the same width as each retro-reflective section 101. The distance of separation of the two retro-reflective sections 101 encodes a bit which in this case is a "0" bit. FIG. 1b shows two retro-reflective sections 101 separated by a non retro-reflective section 103 which is the double the width of each retro-reflective section 101. This distance of separation of the two retro-reflective sections 101 encodes a "1" bit. Note that by separating each retro-reflective section by a length which is relative to the length of a retro-reflective section, for example, the length of an adjacent retro-reflective section provides a distance reference which can be used for determining the distance of separation between two retro reflective sections. This can be useful, for example, when an image of a barcode is taken using a wide angle lens or the barcode is mounted on a curved surface.

FIG. 1c shows an example barcode using the basic building blocks of FIGS. 1a and 1b. However, the first element of the barcode is a double length retro-reflective section 104 which is termed a sync symbol. The elongate nature of this section is used to identify the start of the barcode and further, because its length is double that of a standard retro-reflective section, its length can be used to determine the length of a standard retro-reflective section which can be useful when interpreting some images of a barcode. The rest of the barcode alternates between non retro-reflective sections and standard width retro-reflective sections. The non retro-reflective sections define the bits and in this example the sections are a short section 102, followed by a long section 103, followed by two short sections 102 and accordingly the barcode of FIG. 2c defines a bit string of "0100".

FIG. 1d is an illustration of the example barcode of FIG. 1c as it would be seen in a picture taken according to the preferred embodiment of the present invention. In this figure the retro-reflective sections (114, 111) reflect infrared (IR) light whereas the non retro-reflective sections (112,113) do not. Accordingly the value encoded by the barcode is determined based on the distance of separation of reflected IR light sections in a picture taken of the barcode.

In the preferred embodiment of the present invention retro-reflective barcodes are attached to appropriate places on the ceiling of a store. FIG. 2 illustrates this for an area of an example ceiling, as viewed form the floor looking up at the ceiling. The area of ceiling 200 comprises ceiling tiles 201 which are held up by a metal framework which fills the gaps between the tiles. Attached to the ceiling are lights 202 and retro-reflective barcodes 203, 204, 205, 206. The barcodes are backed by a magnetic strip for easy attachment to the ceiling and are placed apart from lights 202 to avoid optical interference in an image taken of the barcodes. Each barcode encodes a different number as described with reference to FIGS. 1a-1d. Barcode 203 starts with elongate section (sync symbol) 207 and comprises non-reflective sections which encode "0001". Similarly barcodes 204, 205, and 206 encode "0010", "0011" and "0100" respectively such that each barcode is uniquely identifiable and may be associated, for example, in a database with an entry which records the physical orientation and location of the barcode within the store. Note that the orientation of each barcode is different, however, this is not problematic due to the elongate sections 207, 208, 209 and 210 marking the start of each barcode.

The view of a shopping cart 211 in FIG. 2 is also shown from the floor, looking up through the bottom of the cart to the ceiling. Note that shopping cart 211 is oriented at an angle to a physical reference line 221 in the store and is located a distance from physical reference point 220. For example, the reference line could be a store wall. A description of how the angle and distance can be calculated follows.

Note, the retro-reflective and non retro-reflective sections of each barcode may be any color/texture provided they perform the function of reflecting or not reflecting IR light as required by the preferred embodiment. Accordingly they may, for example, be made in a color to make them less obtrusive and/or more aesthetically pleasing when considering the color of the ceiling tiles and/or metal framework. For example, if the ceiling is black, the tags can be covered by a visually dark but IR transparent cover.

Further note that one or more of the non-reflective sections of a barcode may comprise an area of VELCRO material to enable easy removal of a barcode using, for example, a pole with a complementary VELCRO material at one end.

Figure 3:
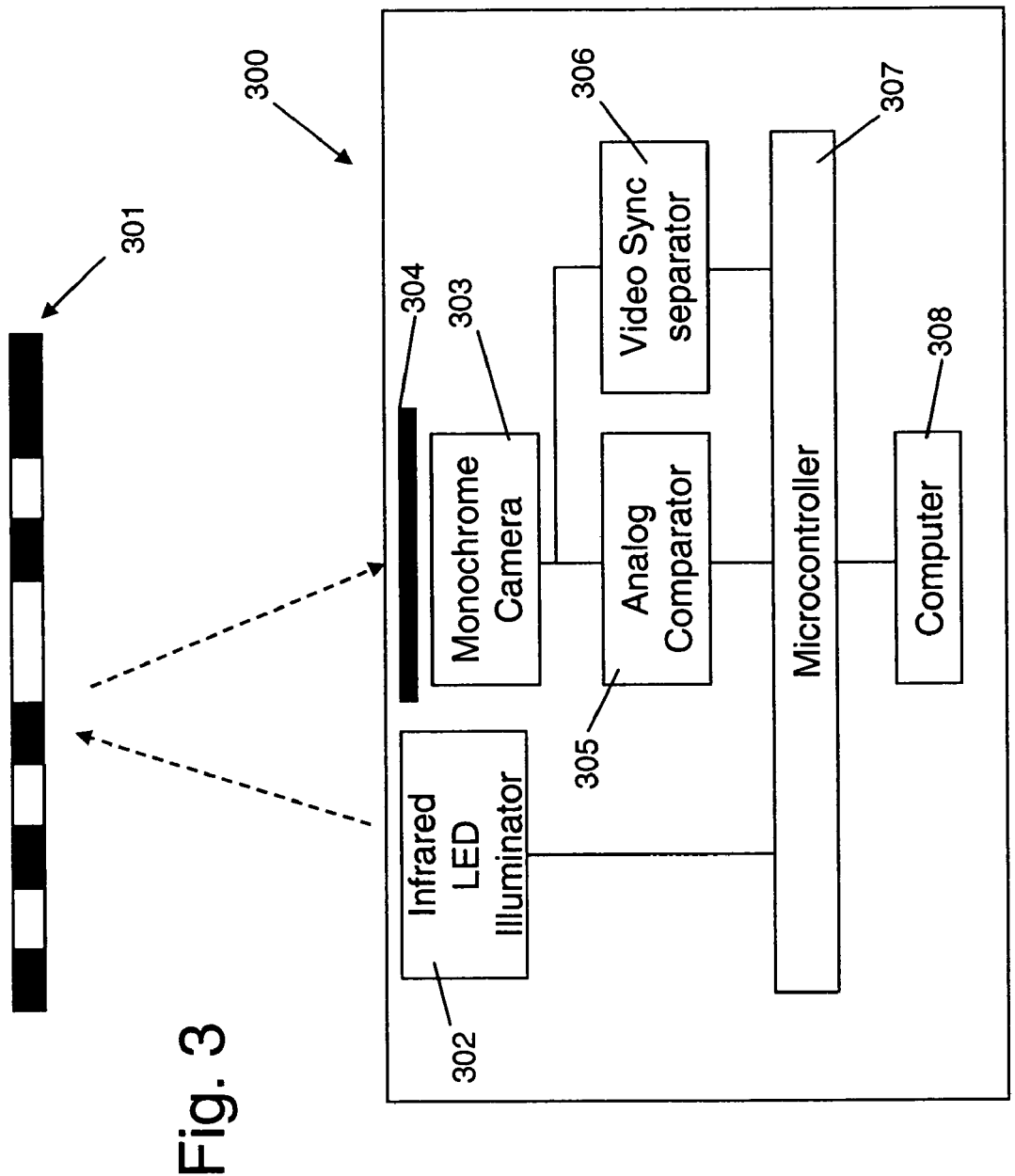
FIG. 3 is a schematic diagram of a system which is used to obtain and interpret an image of a retro-reflective barcode target according to the preferred embodiment of the present invention.

FIG. 3 is a schematic diagram of a system 300 for mounting on a shopping cart and which is used to obtain and interpret an image of a retro-reflective barcode target according to the preferred embodiment of the present invention. The system 300 comprises an Infrared (IR) LED illuminator 302 which is used to broadcast IR light for reflection from a retro-reflective barcode target, for example barcode 301. An image of any reflected light is obtained with a monochrome video camera 303 through an IR-pass visible-block optical filter 304. The filter is used to reduce non-IR light but allow IR light, such as that from IR LED illuminator 302 which is reflected by barcode 301, to pass to the video camera 303.

Video camera 303 is mounted substantially vertically in a shopping cart such that the centre of an image taken by the camera approximately represents the location of the camera (and therefore the location of the shopping cart) and a vertical line drawn on the image represents the direction in which the cart is pointing. However, in other embodiments the camera may be mounted differently provided a position from which the image was taken, relative to a barcode in the image, can be determined.

An image taken by video camera 303 is passed as a grey scale video signal to Analog Comparator 305 and Video Sync Separator 306. Analog Comparator 305 simplifies the video signal by converting the gray scale video signal to a black and white binary signal which, because the IR pass visible block optical filter 304 eliminates nearly all of the non-IR light, leaves just the direct IR beams from the ceiling lights 202 and the reflected IR from barcode 301. The bright IR light causes the analog comparator 305 to output a high binary signal whereas the dark background causes the analog comparator 305 to output a low binary signal.

The Video Sync Separator 306 extracts the vertical and horizontal synchronization signals from the composite video signal output of the monochrome camera 303. Microcontroller 307 uses the video sync signals from Video Sync Separator 306 to identify the start of each image/frame and to determine the x and y location within an image of each image pixel received from comparator 305. At the beginning of every horizontal synchronization signal, an internal counter running inside the microcontroller 307 that represents the X axis position counter is reset to zero, indicating the beginning of a new row of pixels. At the beginning of every vertical synchronization signal, the Y axis position counter is reset to zero, indicating the start of a new frame. The X axis position counter is incremented by an internal oscillator, typically the microcontroller 307 clock. The Y axis position counter is incremented by the horizontal synchronization signal.

To minimize Microcontroller 307 memory and processing time requirements, the rising edge of the Analog Comparator 305 causes an interrupt. During the interrupt routine, the values of the X axis position counter and the Y axis position counter are stored. The interrupt controller in the Microcontroller 307 is then configured to generate an interrupt on the falling edge of the Analog Comparator 305, and the process is repeated. Using this method, only the start and stop locations of bright object cause interrupts that require processing and storing, eliminating the need for a memory buffer to store an entire image, and the need to process every image pixel.

Optionally microcontroller 307 further controls Infrared LED Illuminator 302, turning it off when it is not needed, and controlling the brightness of Infrared LED Illuminator 302 to send just enough IR illumination to sufficiently illuminate the barcode 301, thereby conserving power.

Optionally, microcontroller 307 takes a first image with the IR LED illuminator 302 on, and a second image with the IR LED illuminator 302 off. The first image is then subtracted from the second image, to remove any external light sources, such as ceiling light 202.

Optionally microcontroller 307 controls a threshold voltage for Analog Comparator 305 to fine tune the image, to enable a barcode, such as barcode 301, to be better distinguished from other IR light sources in an image.

Microcontroller 307 decodes bar code 301 and performs other low level functions and then passes the decoded data to computer 308.

FIG. 4a is an illustration of an image, by reference to FIG. 2, of retro-reflective barcode target 206 taken from shopping cart 211, using a camera mounted to the rear of the cart (pointed vertically upwards toward the ceiling and orientated such that in an image the the cart points from the bottom centre to the top centre of the image), for example video camera 303 of the system of FIG. 3. Note that in FIG. 4a, and in all other figures with an illustration of an image, the illustration is effectively a negative of an actual image, that is, in an image taken by monochrome camera 303, of FIG. 3, the dark areas shown in the illustration would appear light and the light areas shown in the illustration would appear dark. Further, the cross-hair in the centre of the image is not part of the image but indicates the center of the image used by the system as a reference point for which a physical location is to be determined (i.e.: the location of the camera/cart in the store). In other words, the cross hair is the location in the image which is directly over the camera. From the image, the barcode is determined to encode the value "0100" (or 4) and this value is used as index into a database to obtain an entry which provides the physical orientation and location of the retro-reflective barcode 301 in the store.

FIG. 4b is the image of FIG. 4a but with an illustration of the shopping cart 211 (re: FIG. 2) from which the image of FIG. 4a was taken. The view of shopping cart 211 in FIG. 4b is also shown from the floor, looking up through the bottom of the cart to the ceiling. The shopping cart has a camera 411 mounted to its rear (pointed vertically upwards) for taking the image and accordingly the location of camera 411 in image 4b coincides with the location of the cross hair 400 in FIG. 4a. Due to the orientation of the camera relative to the shopping cart, the direction in which the cart is pointing in FIG. 4b (i.e.: when the image of FIG. 4a was taken) is along a vertical line through the centre of the image. Note that the barcode and orientation of the shopping cart 211 in FIG. 4b matches that of barcode 206 and shopping cart 211 in FIG. 2.

In the preferred embodiment of the present invention, data which describes the physical location and orientation of the barcode in the store is stored in a database. This data comprises the physical/store location of the center of the synch symbol and the physical/store orientation of the barcode along its length (for example angle 902 in FIG. 9). The physical/store location comprises X and Y coordinates, in an appropriate physical unit system, relative to a reference point in the store, for example reference point 220 of FIG. 2. In the preferred embodiment the units are meters but in other embodiments other units may be used, for example feet or ceiling tiles. The physical/store orientation is an angle relative to a store reference line, for example store wall 221 of FIG. 2. For example, the orientation may comprise a value between 0 and 360 degrees. Optionally the physical location data may comprise additional data which may be useful in subsequent calculations, for example, the length of the sync symbol, the length of the barcode, and the height of the barcode.

Figure 5:
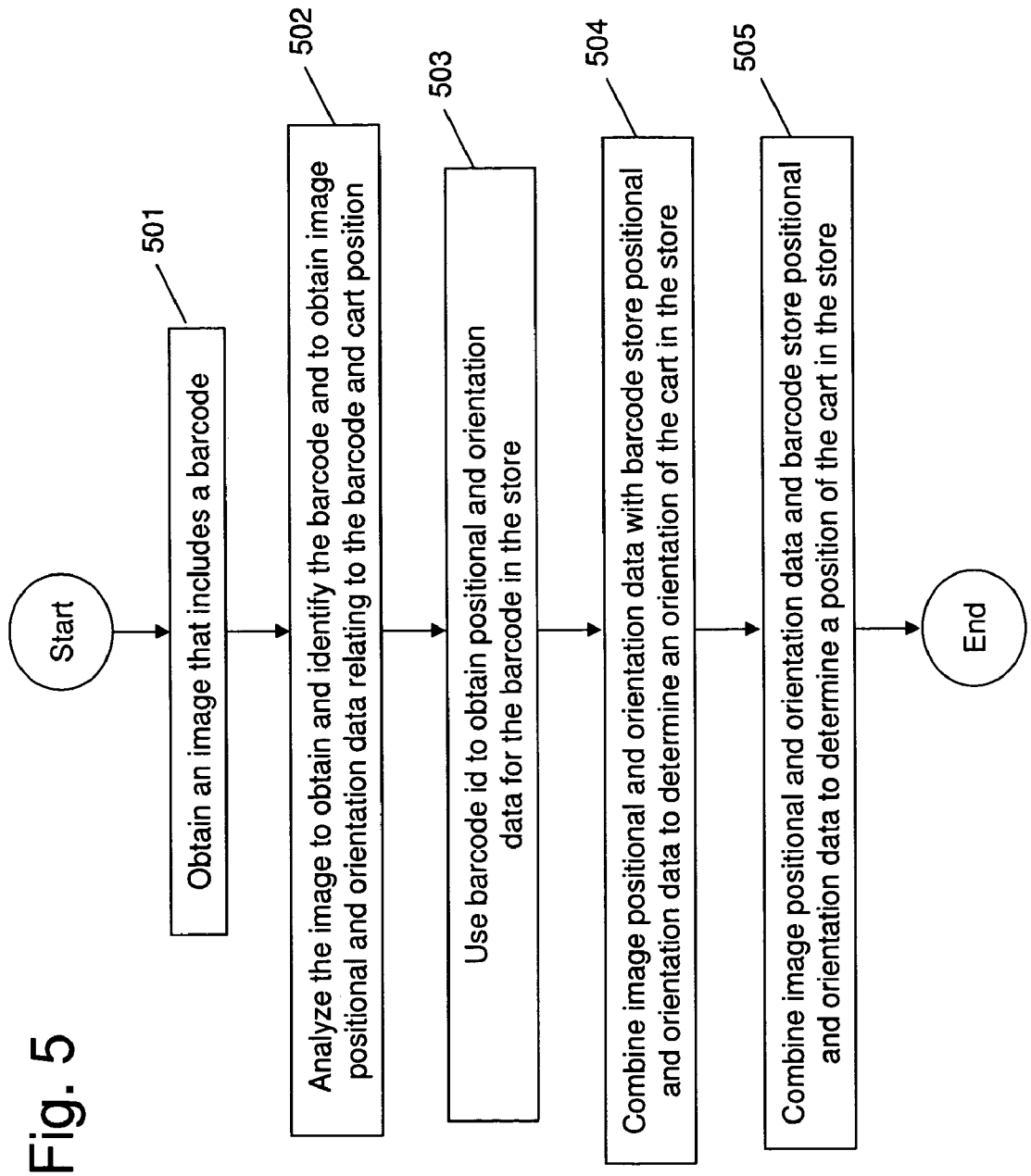
FIG. 5 is a flow diagram of a method performed by the system of FIG. 3 used to obtain and interpret an image of a retro-reflective barcode target according to the preferred embodiment of the present invention.

FIG. 5 is a flow chart of the method of the preferred embodiment of the present invention for obtaining the physical/store location and orientation of a shopping cart in a store. At step 501 an image is obtained from a camera mounted on a shopping cart, the image includes at least one retro-reflective barcode target. The image is a binary image with one bit for each pixel based on output from analog comparator 305. The comparator outputs a high signal if a pixel is bright and a low signal if the pixel is dark.

At step 502 the image is analyzed to obtain and decode the retro reflective barcode target and to determine image positional data and image orientation data relating to the relative position of the barcode and cart in the image. The image positional data comprises the angle and distance (in image units) from the barcode to the cart, and the image orientation data comprises the direction in which the cart is pointing relative to the barcode.

The orientation of the barcode in the image will be referred to as "Barcode Image Orientation". This is the angle in degrees between a line through the long dimension of the bar code and a first image reference line which is a horizontal line through the image and through the centre of the sync symbol.

The direction in which the cart is pointing relative to the barcode in the image is the "Cart/Barcode Image Orientation". This is the angle between a line through the long dimension of the bar code and a second image reference line which represents the direction the cart is pointing relative to the image. In the preferred embodiment the camera is mounted on the shopping cart in such a manner that the second image reference line runs vertically to the image.

The angle and distances from the barcode to the relative position of the barcode to the cart are the "Cart/Barcode Image Angle" and "Cart/Barcode Image Radius" respectively. The "Cart/Barcode Image Angle" is the angle between a line through the long dimension of the bar code and a third reference line which runs from the location of the image reference point (cross hair) 400 to the centre of the barcode's sync symbol. The "Cart/Barcode Image Radius" is the distance (in image units) from the location of the image reference point (cross hair) 400 to the centre of the barcode's sync symbol. The image reference point is the location in the image which represents the location of the shopping cart, and is a point directly above the camera 303 on shopping cart 211. Together the "Cart/Barcode Image Angle" and the "Cart/Barcode Image Radius" make up the "Cart/Barcode Image Polar Coordinates".

At step 503 the decode of the barcode target is used to access a database to obtain the physical orientation and location data of the barcode in the store.

The orientation of the barcode in the store is the "Barcode/Store Orientation". This is the angle between a line through the long dimension of the bar code and a reference line in the store, for example store wall 221 of FIG. 2

The physical location of the barcode is the "Barcode/Store Location". This is the (X,Y) coordinates (in store units) of the location of the centre of the sync symbol relative to a store reference point, for example store reference point 220 of FIG. 2.

At step 504, orientation of the cart in the store is determined. This will be referred to as "Cart/Store Orientation" and is determined from a combination of the "Barcode/Store Orientation" with the "Cart/Barcode Image Orientation".

At step 505, the location of the cart in the store is determined relative to a reference point in the store, for example reference point 220 of FIG. 2. This will be referred to as the "Cart/Store Location" and is determined by combining the "Barcode/Store Orientation", the "Barcode/Store Location" and the "Cart/Barcode Image Polar Coordinates". However the "Cart/Barcode Image Radius" of the "Cart/Barcode Image Polar Coordinates" must first converted from image units to store units.

A breakdown of step 502 and the calculation of steps 502, 504 and 505 will now be described further below with reference to FIGS. 6, 7, 8, and 9.

Figure 6:
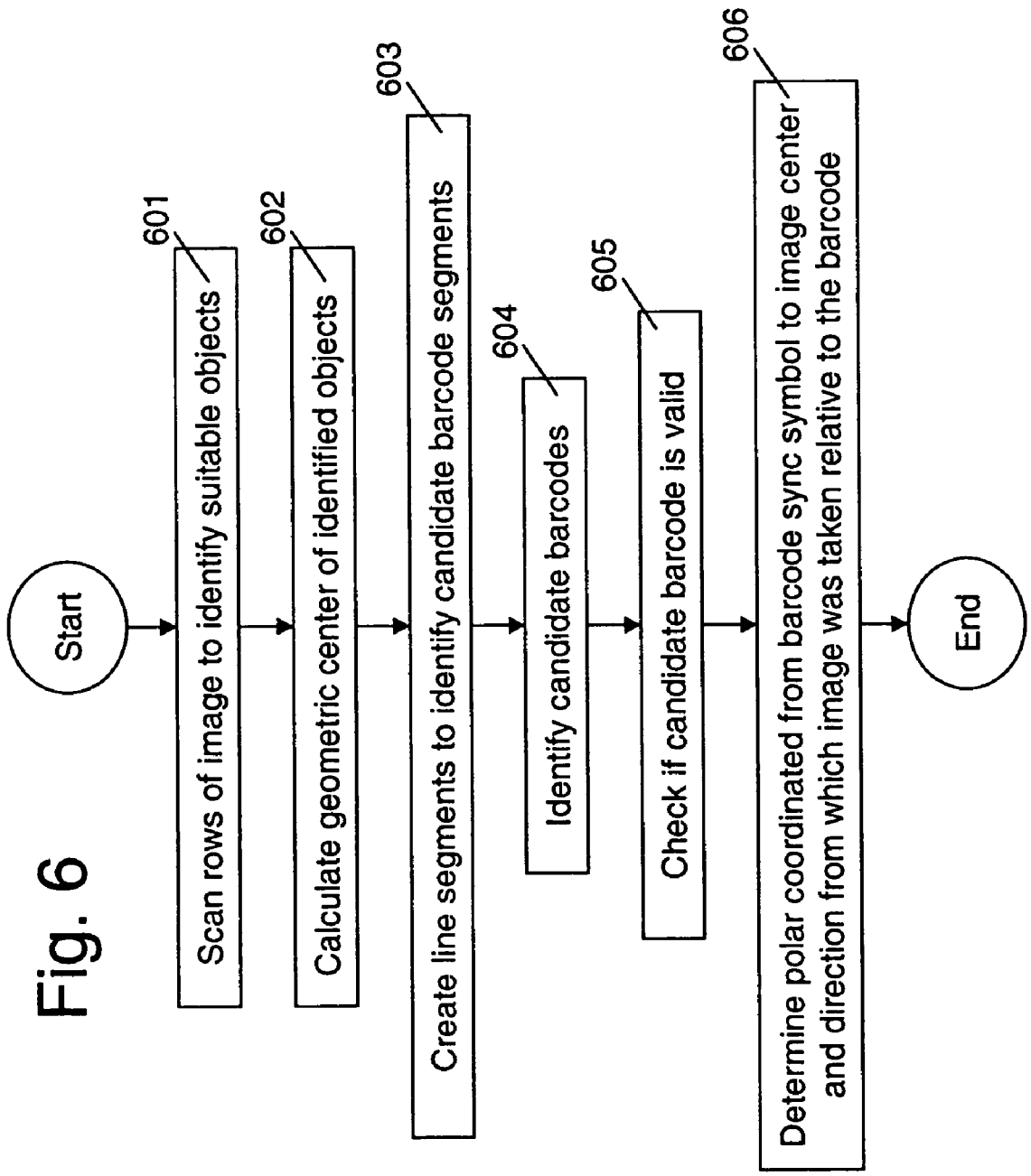
FIG. 6 is a flow diagram of a method which is a more detailed description of a method step from FIG. 5 for analyzing an obtained image.

FIG. 6 is a flow chart of the method step of 502 of FIG. 5, in which a binary image is analyzed to identify and decode the retro-reflective barcode target, and further to determine image positional data relating to the barcode and cart position (centre of the image).

At step 601 rows of the binary image are scanned from left to right to identify suitable objects. Objects are identified as a grouping of adjacent bright pixels surrounded by dark pixels. During the scan, a run length encoder (RLE counter) is started when a bright pixel follows a dark pixel and stopped at a first subsequent dark pixel. If the RLE counter is outside a predetermined range which represents an acceptable width of a barcode element the row of bright pixels, and any other adjacent bright pixels, are ignored because the object which they represent is too large or too small to be part of a barcode. Further if an object contains a number of pixels which is not within a pre-determined range, the object is ignored because it is too small or large to be a barcode segment. Once all of the of pixels, that is entire image, has been processed a binary image has been obtained which comprises only objects (set bits) which are considered suitable for a barcode segment.

At step 602 the geometric centre of each suitable object is determined in terms of pixel coordinates from a bottom left corner of the image.

At step 603 the geometric centre of each suitable object is used it create a line segment between neighboring objects and identify candidate barcode segments. A line segment measures the distance between two objects and objects are identified as candidate barcode segments if the length of the line segment between them is within a pre-determined range.

At step 604 a candidate barcode is identified by assuming that the largest candidate barcode segment is a sync symbol (104 of FIG. 1c). The sync symbol is then used as an anchor point to string together neighboring barcode segments into a candidate barcode. Neighboring barcode segments are located by scanning the created binary image left to right and top to bottom from the sync symbol.

At step 605 the validity of the identified candidate barcode is checked by checking that is has the correct number of segments (bits) and optionally that is has the correct parity. For example, in the preferred embodiment, although not shown in the figures, two parity bits are used for this purpose.

Finally, at step 606, the direction in which the cart is pointing relative to the barcode ("Cart/Barcode Image Orientation") and the polar coordinates (in the image) of the cart relative to the barcode ("Cart/Barcode Image Polar Coordinates"), are calculated for use in steps 504 and 505 of FIG. 5

Note that in the method of FIG. 6 several pre-determined ranges are used, namely: a predetermined range which represents an acceptable width of a barcode element; a predetermined range for the number of pixels in an acceptable object; and a predetermined range for the length of a line segment. In the preferred embodiment these ranges are obtained empirically, based on a number of barcode images. For example, if the method of FIG. 6 is run for several images the data for valid identified barcodes can be used to determine suitable ranges.

Figure 7:
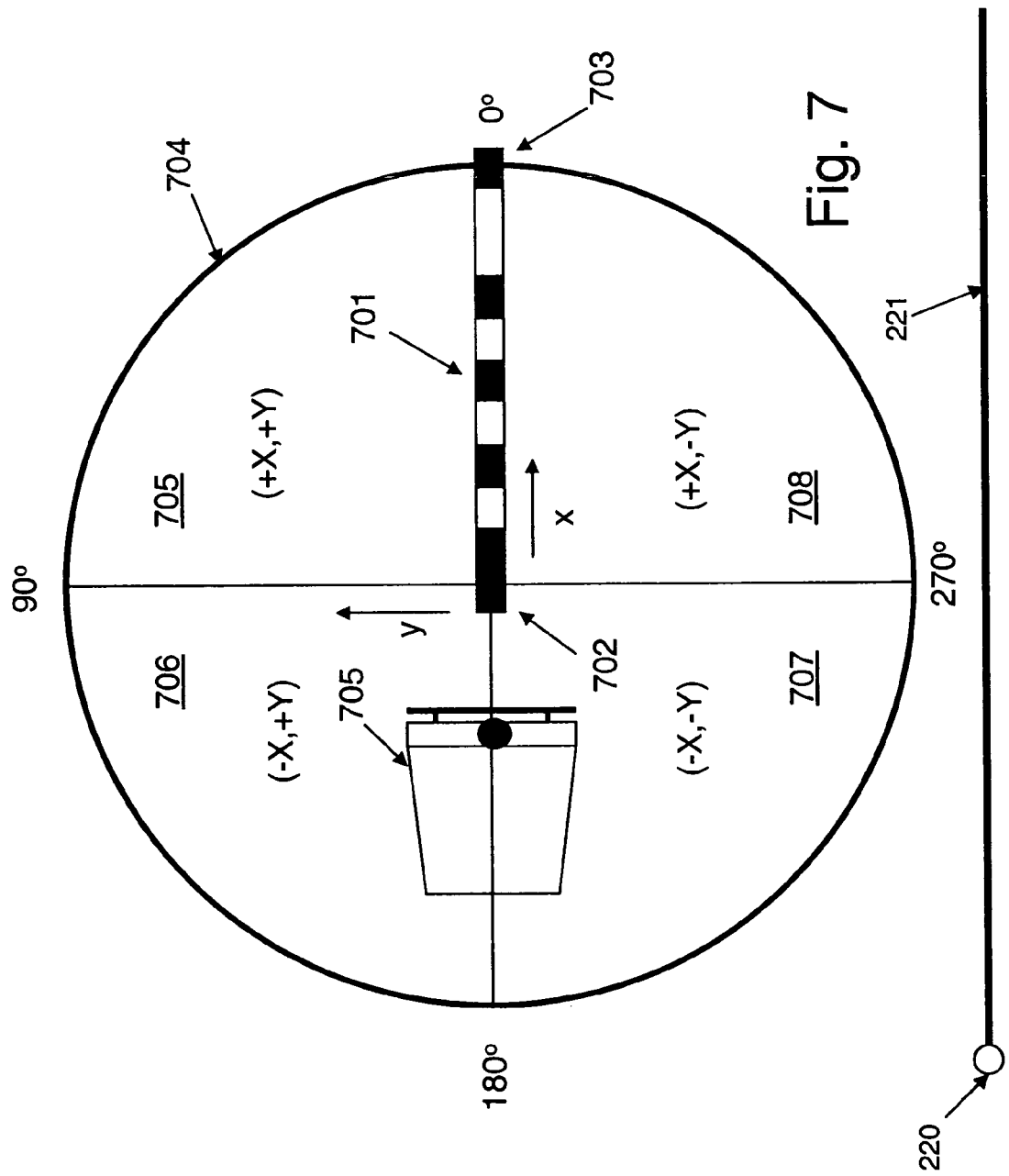
FIG. 7 is a diagram (as viewed from the floor looking up at the ceiling) to illustrate the orientation scheme used in the preferred embodiment of the present invention.
Figure 8:
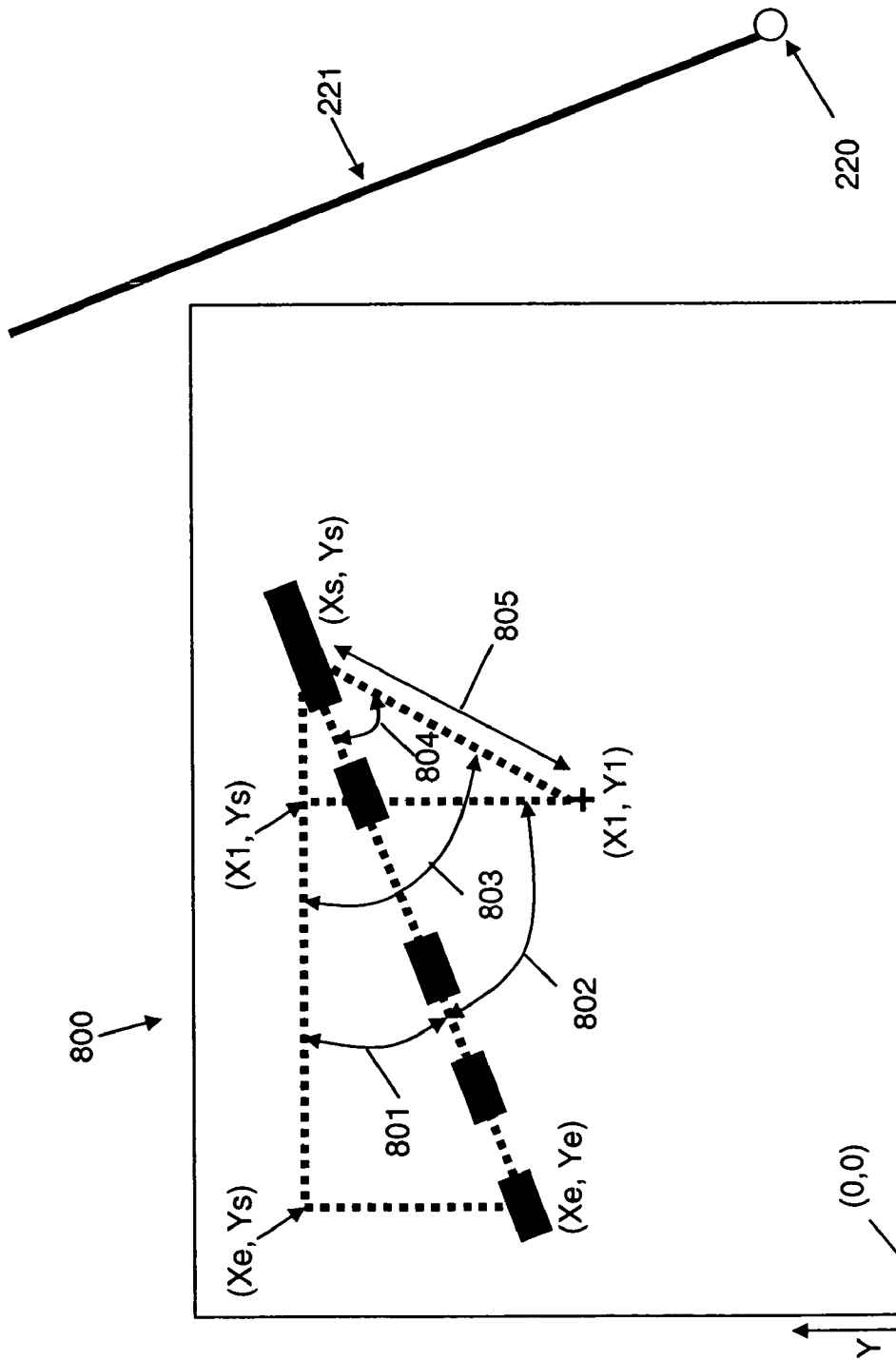
FIG. 8 is the image of FIG. 4 with additional markings used to describe the calculations used to analyze an image of a barcode. All distances and coordinates in FIG. 8 are in image units.

The calculations of steps 504, and 505 of FIG. 5, and step 606 of FIG. 6, are now described by way of example with reference to FIGS. 7, 8 and 9.

FIG. 7 illustrates the slope (angle) scheme used in the preferred embodiment of the present invention, for example, to determine a value for the store orientation of a barcode or shopping cart with respect to a reference wall of a store, for example store wall 221 (also shown in FIG. 2). The figure shows a barcode 701 comprising a sync symbol 702 and a last barcode segment 703. The orientation of the barcode in which it is parallel to the store wall 221 with the sync symbol to the left, as shown in the figure, is considered to be 0 degrees. If the barcode is rotated anti-clockwise about the centre of the sync symbol 702, the center of the last barcode segment describes circle 704, which may be split into 4 quadrants 705,706,707, 708. In each of these quadrants the relative signs of X and Y are shown where X and Y represent the value of the x and y coordinates of the centre of the end segment 703 with the x and y coordinates of the center of the sync symbol 702 subtracted, respectively. Accordingly because trigonometric functions will only provide angle calculations for +/−90 degrees, angles calculated relative to horizontal will need to be adjusted by +180 degrees in quadrants 706 and 707 and +360 degrees in quadrant 708.

FIG. 7 also shows a shopping cart 705 which is also oriented 0 degrees relative to store wall 221. At 0 degrees the cart is parallel to store wall 221 with the front of the cart to the right and the rear of the cart to the left. Accordingly, when compared to barcode 701, in order to determine the quadrant of the cart orientation the front of the cart is equivalent to sync symbol 702 and the rear of the cart is equivalent to the last barcode segment 703. As a result if the cart is rotated anticlockwise about the centre of the front of the cart, the center of the rear of the cart will describe circle 704, which is split into 4 quadrants 705,706,707,708.

FIG. 8 shows an image (800) which is the image of FIG. 4*a* but with additional markings which will be used to explain the calculations performed to obtain orientation and location data in relation to the image before applying physical location data of the barcode. Accordingly, with reference to FIG. 2, this image is of retro-reflective barcode target 206 taken from shopping cart 211 and is thus a view from the camera looking up at the ceiling. All points in FIG. 8 are referenced by (X,Y) coordinates (in image units) relative to the origin of the image, which is the lower left corner of the image. To ease understanding, FIG. 8 also shows the position of physical reference line (store wall) 221 relative to the image.

In FIG. 8, point (X1,Y1) is the position in the image from which the image was taken (i.e.: the position of the shopping cart), point (Xs,Ys) is the position of the centre of the sync symbol of the barcode in the image, and point (Xe,Ye) is the position of the center of the last segment of the barcode. The points are determined based on their pixel location relative to the bottom left corner (0,0) of the image. Further the line from (X1,Y1) to (X1,Ys) runs vertically through the image and represents the direction in which the shopping cart was pointing when the image was taken. The figure also shows the position of store wall 221 relative to the image.

The orientation and location data to be calculated from the image comprises angles 802 and 804 (in degrees), and distance 805 (in image distance units). Angle 802 is the "Cart/Barcode Image Orientation" in degrees and angle of the direction in which the cart is pointing relative to the barcode. Angle 804 is the "Cart/Barcode Image Angle" which is the angle from the cart to the barcode target. Distance 805 is the "Cart/Barcode Image Radius" which is the distance in the image (in image units) from the cart to the barcode target. Angle 804 and distance 805 make up the "the "Cart/Barcode Image Polar Coordinates" and are the polar coordinates (in image distance units) of the centre of the image relative to the centre of the sync symbol and a line through the long dimension of the bar code.

Angle 802 ("Cart/Barcode Image Orientation") is the direction the cart is pointing relative to the barcode and is the angle between a vertical line through the center of the image (X1, Y1) (which represents the direction the cart is pointing relative to the image) and a line which runs along the length of the barcode. To determine angle 802, angle 801 is first determined. Angle 801 is the "Barcode Image Orientation" and represents the angle between a line which runs along the length of the barcode and a horizontal line in the image which runs through the center of the sync symbol based on the scheme described with reference to FIG. 7. Angle 801 is determined using the position of the centre of the sync symbol (Xs,Ys) and the position of the centre of a different barcode element, in this example, that of the last or end barcode element (Xe, Ye). Using these two positions, angle 801 is calculated using basic trigonometry by considering a right angled triangle defined by points (Xs, Ys), (Xe, Ye) and (Xe, Ys). For example, to adhere with the scheme of FIG. 7 (coordinates of the different barcode element are subtracted from those of the sync symbol) the angle 801 can be calculated using the equation $\tan^{-1}((Ye-Ys)/(Xe-Xs))$. Further (Ye−Ys) and (Xe−Xs) are both negative and as a result the angle is in quadrant 707 of FIG. 7. Thus it is necessary to adjust the calculated angle by +180 degrees. Once angle 801 is known, angle 802 is determined based on the fact that the sum of angles adjusted 801 and 802 is 270 degrees. Note that sum of angle 801 and 802 is 270 degrees because the angle is between the horizontal reference line which runs through the centre of the sync symbol and the line from X1, Y1 vertically up the image to the horizontal line, in FIG. 7 this corresponds to 270 degrees.

Angle 804 is the angle between a line from the centre of the image to the center of the sync symbol and a line which runs along the length of the barcode. To determine angle 804, angle 803 is first determined. Angle 803 is the angle between a horizontal line in the image which runs through the center of the sync symbol and a line which runs from the centre of the image to the centre of the sync symbol. Using the same trigonometric principles used to determine angle 801, angle 803 can be calculated using the equation $\tan-1(Y1-Ys)/(X1-Xs)$ adjusted by +180 degrees. Once angle 803 is known angle 804 is calculated as the difference between angles 803 and 801. ??

Finally, distance 805 represents the distance (in image distance units) from the shopping cart to the centre of the sync symbol and is the length of the line from the center of the image (X1,Y1) and the center of the sync symbol (Xs,Ys). This can be determined using basic trigonometry using the right angled triangle defined by points (X1,Y1), (Xs, Ys) and (X1,Ys). For example distance 805 can be calculated from the equation (Ys−Y1)/(sin(angle 803)).

Note that in FIG. 8 the angles 802 and 804 are approximately 65, and 45 degrees respectively. Further note that in the preferred embodiment of the present invention the units of the X and Y co-ordinates of the images are pixels.

FIG. 9 is FIG. 8 which has been rotated such that physical reference point 220 is at the lower left of the figure and physical reference line (store wall) 221 is a horizontal line along the bottom of the figure. This rotation causes the barcode in FIG. 9 to match the orientation of the barcode in the store. The barcode in FIG. 9 is barcode 206 of FIG. 2 which, according to the scheme of FIG. 7, can be seen to be orientated at 90 degrees relative to store wall 221.

Further FIG. 9 includes markings which will be used to describe how the "Cart/Store Location" and "Cart/Store Orientation" are determined. Accordingly, in FIG. 9 the co-ordinate markings are based on store locations relative to reference point 220. Comparing with FIG. 8, point (Xs, Ys), the location of the sync symbol, is now point (Xb,Yb) the "Barcode/Store Location" and point (X1,Y1) is now point (Xc,Yc) the "Cart/Store location". Further distance 805 is now distance 805', which is distance 805 but scaled from the units of the image co-ordinate system to the units of the store co-ordinate system. Angles 802 and 804 are the same as those of FIG. 8 because these are preserved in the rotation. Angle 902 is the "Barcode/Store Orientation" and angle 901 is the "Cart/Store Orientation". It is required to determine the value of (Xc,Yc) and angle 901.

The "Cart/Store Orientation" (angle 901) in degrees is obtained by combining the "Cart/Barcode Image Orientation" (angle 802) with the "Barcode/Store Orientation" (angle 902). The "Barcode/Store Orientation" is obtained by either using the decode of the barcode to index into a database or from information which is encoded directly in the bar code. Note that angle 802 will be zero or 180 degrees if the shopping cart is aligned parallel with the bar code.

Accordingly:

"Cart/Store Orientation"="Cart/Barcode Image Orientation"+"Barcode/Store Orientation"

or

Angle 901=Angle 802+Angle 902

The "Cart/Store Location" in units of the store coordinate system is determined by combining the "Barcode/Store Orientation", the "Barcode/Store Location", and the "Cart/Barcode Image Polar Coordinate" scaled from image units to store co-ordinates units.

Distance 805 ("Cart/Barcode Image Radius)" of FIG. 8 is scaled to distance 805' of FIG. 9 by converting the distance 805 from the units of the image (e.g.: pixels) to the units of the store co-ordinate system (e.g.: meters). Accordingly distance 805' is referred to as the "Cart/Barcode Store Radius". For example, if the length of a sync symbol is known in both sets of units the scaling factor may be determined from them. In this case, the length of a sync symbol is stored in the database with the barcode physical location data, and the length of the sync symbol in pixel units determined from the image. Alternatively the length of any aspect of the barcode which is known or can be determined in both sets of units may be used, for example the length of a segment or the entire barcode.

The relative displacement of the "Cart/Store Location" (Xc,Yc) from the "Barcode/Store Location" (Xb,Yb) is now known but in polar co-ordinates ("Cart Barcode Store Polar Coordinates"). The polar coordinates (angle, radius) comprise Angle 903 ("Cart/Store Angle") and distance 805' ("Cart/Barcode Store radius"), where angle 903 is angle 804 ("Cart/Barcode Image Angle")+angle 902 ("Barcode/Store Orientation"). However in x and y co-ordinates of the store system, the displacement may be expressed as ((Xc−Xb), (Yc−Yb).

To convert polar coordinates to x and y coordinates the following equations may be used $X = r\cos(\theta)$ $Y = r\sin(\theta)$ Where θ is the angle, and r the radius, of the polar coordinates.

Accordingly for the displacement of the "Cart/Store Location" (Xc,Yc) from the "Barcode/Store Location" these equations may be rewritten, with X as (Xc−Xb), Y as (Yc−Yb), r as distance 805' ("Cart/Barcode Store Radius"), and θ as angle 903 ("Cart /Store Angle"), as follows:

$(Xc-Xb) = \text{distance } 805' * \cos(\text{angle } 903)$ $(Yc-Yb) = \text{distance } 805' * \sin(\text{angle } 903)$ And therefore the "Cart/Store Location" coordinates (Xc, Yc) can be determined from:

$Xc = Xb + \text{distance } 805' * \cos(\text{angle } 903)$ $Yc = Yb + \text{distance } 805' * \sin(\text{angle } 903)$ Where (Xb,Yb) is the "Barcode/Store Location" and angle 903 is angle 804 ("Cart/Barcode Image Angle")+angle 902 ("Barcode/Store Orientation").

Accordingly the "Cart/Store Location" (Xc,Yc) and "Cart/Store Orientation" (angle 901) of the shopping cart form which the image of FIG. 4 was taken has been determined.

Note that the size of the each section of the barcode and the overall length of the barcode may vary according to the application. For example the size may be determined according to the expected distance of the camera from the barcode when an image is taken, the resolution of the camera used and the capabilities of software used to interpret the image to locate a read the barcode. For example, based on a typical shopping cart that would hold the camera 4 feet over the floor, camera to bar code distance (related to store ceiling height) of 8-12 feet, and use of an image of 640×480 pixels camera (VGA format), a section size of ¾ inches by ¾ inches has been found to work well. Further this size is compatible with the typical metal frame used with suspended ceilings. A higher ceiling may be accommodated by increasing the IR illuminator (302 of FIG. 3) brightness and/or increasing the size of retro-reflective sections (101 of FIG. 1) and/or increasing the resolution of the camera.

Figure 10A:
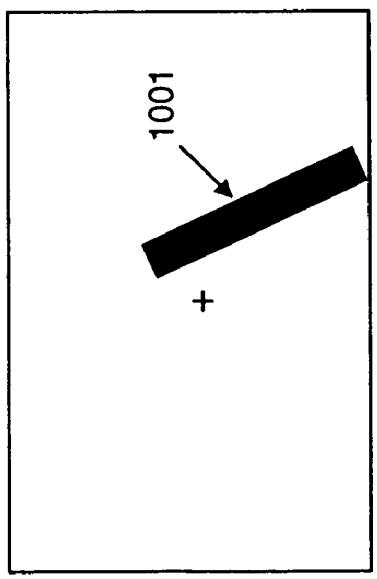
FIGS. 10a-10c are illustrations of further example images taken by the system of FIG. 3 according to the preferred embodiment of the present invention.
Figure 10B:
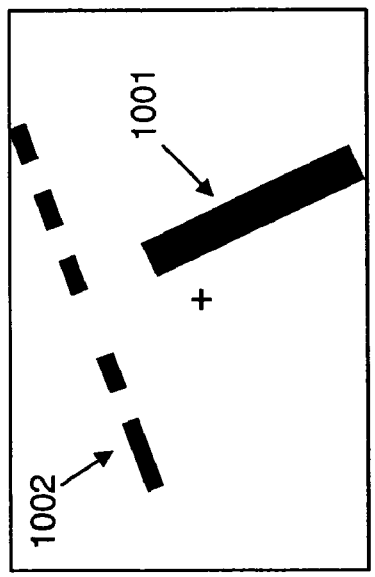
Figure 10C:
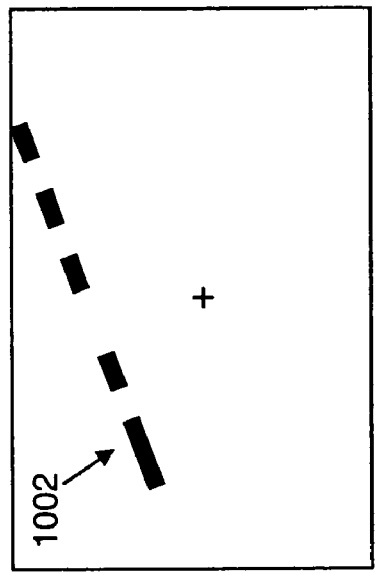

FIGS. 10a, 10b and 10c are illustrations of images which may be used in an extension to the preferred embodiment of the present invention. This involves use of several images to reduce light interference in an image of a retro-reflective barcode target which is useful, for example, in situations where such interference is problematic. FIG. 10a shows a first image which was taken without an infrared light used to illuminate a retro-reflective target and as a result the image includes only background light data. This example is intended to show a fluorescent light 1001 in the lower right corner of the image. FIG. 10b then shows an image from the same position but which was taken with an infrared light on and as a result the image includes both the background light and infrared light reflected by the retro-reflective barcode target 1002. This permits image 10c to be obtained, which is the image of FIG. 10b but with the background data from the image of FIG. 10a subtracted. As a result, the image of FIG. 10c includes only the reflected infrared light which in this example is only the infrared light reflected by the retro-reflective barcode target. Accordingly interference in image 10a has been removed.

Figure 11:
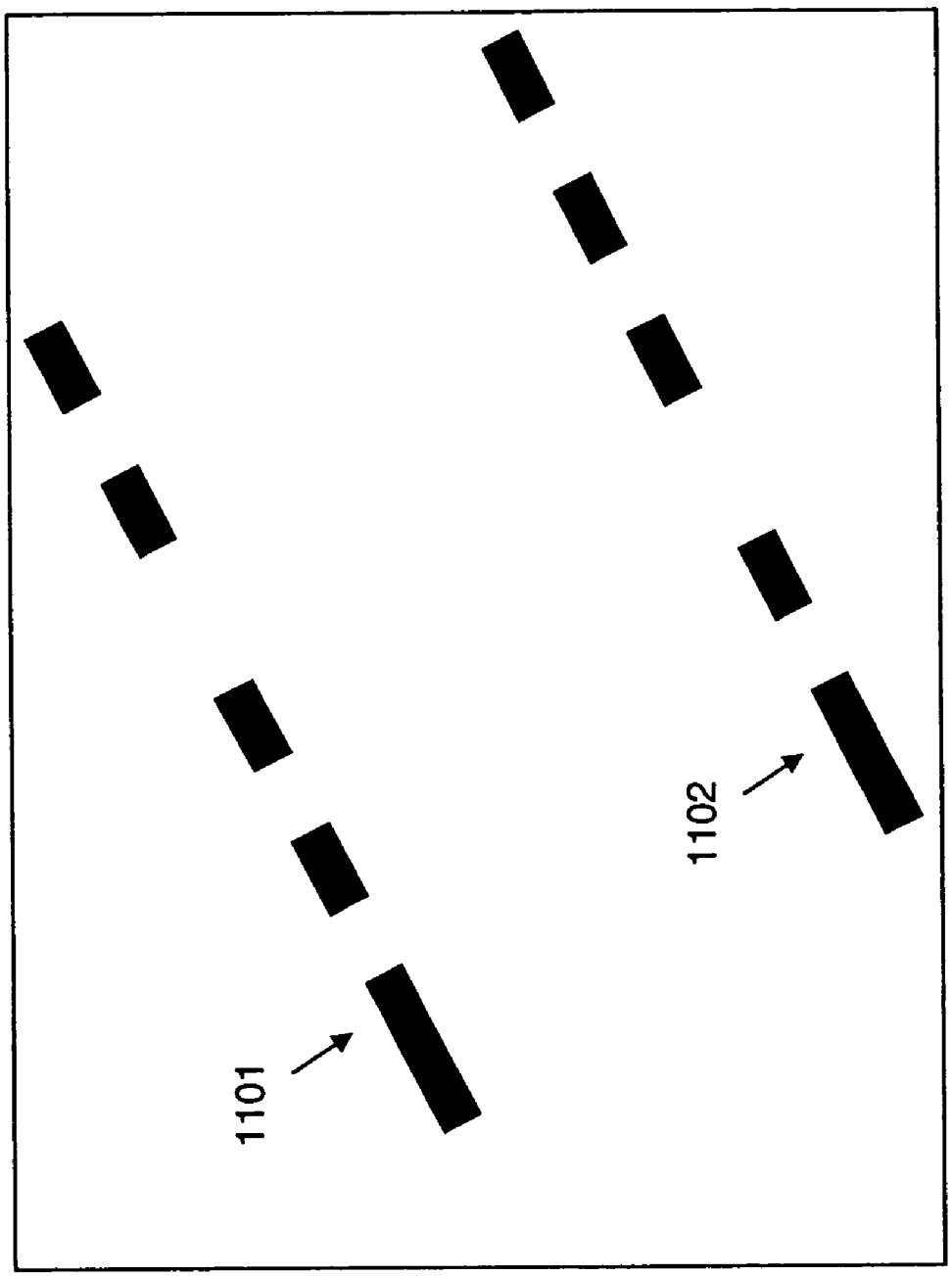
FIG. 11 is an illustration of an example image containing two barcodes taken by the system of FIG. 3 according to the preferred embodiment of the present invention.

FIG. 11 illustrates an image including two retro-reflective barcode targets. In another extension to the preferred embodiment of the present invention, such an image is used to calibrate a newly installed, or recently modified, barcode arrangement. If the location (X and Y coordinates) of a first barcode 1101 is known the location of a second barcode 1102 can be determined by measuring the number of X and Y pixels between the first and second barcode, and multiplying the pixel lengths by the scaling factor (e.g. inches per pixel). Accordingly, if the location in a store of a barcode is known, the location of any barcode which can be included in an image of that barcode can be determined. This process may then be repeated for any barcode with a determined location and as a result, if the barcodes are placed suitably throughout the store, the location of every barcode can be determined provided the location of at least one barcode is known. For example, with reference to FIG. 3, if the location of barcode 203 is known and an image is taken which includes barcodes 203 and 205, the position of barcode 205 can be determined. Then, if an image is taken which includes barcodes 205 and 206, the position of barcode 206 can be determined. This process can then be repeated to determine the position of barcode 204 and further in a large store could be used to determine the position of all barcode in a store. If a barcode does not simultaneously appear in the image with a barcode of known location, other objects that are captured by the imager (including lights) can be used as waypoints, that is the X and Y distance of a way point to a barcode of known location is measured, and added to the X and Y distance of the way point to a barcode of unknown location.

Further, with reference to FIG. 7, in another extension to the preferred embodiment of the present invention, the image is used to check the calibration of the system. For example if the location of both retro-reflective barcodes are known, one of the retro-reflective barcodes may be used to determine the location of the other. The determined location may then be compared with the known location of the other retro-reflective barcodes to check whether the determined position is accurate.

Note that a skilled person will realize that many variations are possible to the preferred embodiment of the present invention without departing from the present invention.

For example a barcode target can take any form which encodes readable data which can be used to both identify the target and determine the orientation of the target. Note that this does not require an elongate form, for example a circular target could also be used provided it has a discernable orientation from which a direction of view could be determined.

Further, for example, the barcode could be attached to the ceiling of a store using other means, for example adhesive, velcro pads, ties etc.

Further provided it is possible to identify and encode a barcode target in some applications: use of retro-reflective and non retro-reflective sections may not be required and alternatively different colors may be used. For example this may depends on such things as the light conditions when an image is taken, the resolution of the camera used, and or the capability of the software used for distinguishing objects.

Note in an alternative embodiment, system 300 of FIG. 3 could be, for example, mounted in a known fixed position and a retro-reflective barcode target attached to a shopping cart or other mobile device. Based on an image taken of the barcode target, it would be possible to determine a position of the cart/mobile device. Further, for example, the components of system 300 may vary, indeed any system capable of capturing and analyzing an image could be used. For example a color video camera could be used or alternatively a digital camera which is directed by the microcontroller as to when to obtain an image. Note that if a digital camera is used, the analog comparator 305 and video sync separator 306 are not required and conversion of the image to a binary image may be performed by the microprocessor or by digital logic.

Further, with reference to FIGS. 5 and 6, note that the order of some of the steps may be varied, and some steps may be processed elsewhere. For example, in FIG. 5 the order of steps 504 and 505 may be reversed. In addition, steps 504 and 505 are optional.

Further note that a skilled person will realize many alternatives to the calculation described for determining the location and orientation if a shopping cart as described with reference to FIGS. 6, 7 and 8.

Further note that whilst the preferred embodiment of the present invention has been described in terms of determining the location of a shopping cart in a store a skilled person will realize that in other embodiments the present invention could be used to determine the position of a moveable object within a defined area, for example, a car in a parking lot. This method could be used with existing cameras located in known locations. For example, it could be used with existing security cameras.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In summary the present invention provides a method, apparatus, and computer program product for obtaining the location of, for example, a mobile device. An image of a target in a defined space is obtained, the target encoding data from which its location in the defined space may be determined. The position of a reference point in the image which represents the location of, for example, a mobile device, is determined relative to the target. The location of the mobile device in the defined paces is then determined by combining the location of the target in the defined space with an appropriately scaled version of the relative position of the reference point to the target in the image.

What is claimed is:

1. A method for determining a location of a second linear barcode within a defined space given a location of a first linear barcode within the defined space, the method comprising:

obtaining an image encompassing the first linear barcode and the second linear barcode;

determining pixel lengths by measuring within the image a vertical pixel distance and a horizontal pixel distance between the first linear barcode and the second linear barcode; and multiplying the pixel lengths by a scaling factor to obtain the location of the second linear barcode, the scaling factor relating dimensions of the image to dimensions of the defined space.

2. A method for determining the accuracy of known locations of a first linear barcode and a second linear barcode within a defined space, the method comprising:

obtaining an image encompassing the first linear barcode and the second linear barcode;

determining pixel lengths by measuring within the image a vertical pixel distance and a horizontal pixel distance between the first linear barcode and the second linear barcode;

multiplying the pixel lengths by a scaling factor to obtain a calculated location of the second linear barcode, the scaling factor relating dimensions of the image to dimensions of the defined space; and comparing the calculated location of the second linear barcode with the known location of the second linear barcode.

* * * * *